US012632553B2

(12) United States Patent
 Krylov

(10) Patent No.: US 12,632,553 B2
(45) Date of Patent: May 19, 2026

(54) METHOD AND A SYSTEM FOR IDENTIFYING COMPROMISED DEVICES IN AN APPLICATION INFRASTRUCTURE

(71) Applicant: GROUP-IB GLOBAL PRIVATE LIMITED, Singapore (SG)

(72) Inventor: Pavel Vladimirovich Krylov, Moscow (RU)

(73) Assignee: GROUP-IB GLOBAL PRIVATE LIMITED, Singapore (SG)

( * ) Notice: Subject to any disclaimer, the term of this patent is extended or adjusted under 35 U.S.C. 154(b) by 148 days.

(21) Appl. No.: 18/647,502

(22) Filed: Apr. 26, 2024

(65) Prior Publication Data

US 2025/0165602 A1 May 22, 2025

(30) Foreign Application Priority Data

Nov. 21, 2023 (RU) ................................ 2023130150

(51) Int. Cl.
 *G06F 21/00* (2013.01)
 *G06F 21/56* (2013.01)
(52) U.S. Cl.
 CPC ...... *G06F 21/566* (2013.01); *G06F 2221/034* (2013.01)
(58) Field of Classification Search
 CPC .............. H04W 12/12; G06F 2221/034; G06F 2201/865; G06F 11/22; H04L 63/105
 See application file for complete search history.

(56) References Cited

U.S. PATENT DOCUMENTS

| | | | |
|---|---|---|---|
| 8,510,820 B2 | 8/2013 | Oberheide et al. | |
| 9,154,388 B2 | 10/2015 | Savage et al. | |
| (Continued) | | | |

FOREIGN PATENT DOCUMENTS

| | | | |
|---|---|---|---|
| JP | 2011257810 A | 12/2011 | |
| JP | 5581820 B2 | 9/2014 | |
| (Continued) | | | |

OTHER PUBLICATIONS

Invitation to Respond to Written Opinion with regard to the SG Patent Application No. 10202401331Q mailed Jan. 10, 2026.

(Continued)

*Primary Examiner* — Tri M Tran
(74) *Attorney, Agent, or Firm* — BCF LLP

(57) ABSTRACT

Methods, a server, and an electronic device for identifying compromised user devices in an application infrastructure. One of the methods comprises: in response to receiving, from a given user device, a data container including a unique identifier of the given user device: updating a then current value of the unique identifier in a database, thereby generating an updated value of the unique identifier; and transmitting the updated value of the unique identifier to the given user device; in response to receiving information of the given user device being compromised: generating a then updated value of the unique identifier, indicative of the given user device being compromised; and transmitting a then updated data container with the then updated value of the unique identifier to the given user device, thereby enabling other servers of the application infrastructure to identify the given user device as being compromised.

4 Claims, 5 Drawing Sheets

(56) References Cited

U.S. PATENT DOCUMENTS

| | | | |
|---|---|---|---|
| 9,419,951 | B1 | 8/2016 | Felsher et al. |
| 10,089,683 | B2 | 10/2018 | Dominguez |
| 10,153,901 | B2 | 12/2018 | Thackston |
| 10,339,606 | B2 | 7/2019 | Gupta et al. |
| 10,706,423 | B1 | 7/2020 | Kuo et al. |
| 10,785,287 | B2 | 9/2020 | Prakash et al. |
| 11,170,130 | B1 | 11/2021 | Blumberg et al. |
| 11,259,183 | B2 | 2/2022 | Richardson et al. |
| 11,386,983 | B2 | 7/2022 | Miyamoto et al. |
| 12,346,436 | B2 * | 7/2025 | Lee ........................ G06F 21/554 |
| 2011/0196791 | A1 | 8/2011 | Dominguez |
| 2012/0198535 | A1 | 8/2012 | Oberheide et al. |
| 2015/0006384 | A1 | 1/2015 | Shaikh |
| 2015/0372888 | A1 | 12/2015 | Savage et al. |
| 2017/0195298 | A1 * | 7/2017 | Brand ................... H04L 9/0891 |
| 2018/0227263 | A1 | 8/2018 | O'Reirdan |
| 2021/0097534 | A1 | 4/2021 | Kurian et al. |
| 2021/0243596 | A1 | 8/2021 | Lim et al. |
| 2021/0319437 | A1 | 10/2021 | Johnson et al. |
| 2021/0352049 | A1 | 11/2021 | Aabye et al. |

FOREIGN PATENT DOCUMENTS

| | | | |
|---|---|---|---|
| RU | 2607990 | C1 | 1/2017 |
| RU | 2691830 | C1 | 6/2019 |
| RU | 2795371 | C1 | 5/2023 |
| WO | 2016135708 | A1 | 9/2016 |

OTHER PUBLICATIONS

Search Report with regard to the RU Patent Application No. 2020133675 completed on Mar. 3, 2021.

English Abstract for JP2011257810/JP5581820B2 retrieved on Espacenet on Apr. 14, 2021.

Search Report with regard to the counterpart RU Patent Application No. 2022124168 completed Mar. 27, 2023.

Search Report with regard to the counterpart NL Patent Application No. 2034890 completed Feb. 23, 2024.

"Privacy enhancing data de-identification terminology and classification of techniques", Project Editor/Co-Editor, ISO/IEC 20889, 2018, 62 pages.

Wikipedia, "Card-not-present transaction", retrieved on en.wikipedia. org/wiki/Card_not_present_transaction on Apr. 19, 2024, pdf 3 pages.

Search report issued on Aug. 5, 2025 by the Netherlands Intellectual Property Office in respect of the counterpart Netherlands patent application No. 2037654.

Notice of Allowance with regard to the counterpart U.S. Appl. No. 18/134,669 issued Feb. 27, 2025.

* cited by examiner

METHOD AND A SYSTEM FOR IDENTIFYING COMPROMISED DEVICES IN AN APPLICATION INFRASTRUCTURE

CROSS-REFERENCE

The present application claims priority to a Russian patent application No.: 2023130150 filed on Nov. 21, 2023, and entitled "A PROCESS AND A SYSTEM FOR IDENTIFYING DEVICES IN AN APPLICATION INFRASTRUCTURE," the content of which is incorporated herein by reference in its entirety.

FIELD

The present technology relates broadly to the field of cybersecurity, and, in particular, to methods and systems for identifying compromised devices in an application infrastructure.

BACKGROUND

According to a report of the KPMG analytical center, published in the "Global study on issues of bank frauds", there was an increase in number of bank fraud schemes during the period between 2015 and 2018, including thefts of personal data and accounts, cyberattacks, CNP-attacks ("card not present fraud", en.wikipedia.org/wiki/Card_not_present_transaction). The report also notes a significant growth of authorized payments in favor of fraudsters: the fraudsters manipulate bank clients and trick them into transferring money in a fraudulent way, bypassing banks' control systems. In spite of the fact that most of the deceived clients have transferred money to accounts of the fraudsters on their own volition, they believe that the banks themselves must have mitigated attempts of fraudulent actions.

Banks and other commercial and non-commercial entities around the world invest funds in the development of new technologies for mitigating fraudulent actions: by receiving signals about fraudulent actions in real time, using machine learning algorithms, by using biometrics, behavioral biometrics etc. Most of the existing solutions for preventing and addressing cyber threats have been implemented by accumulating and analyzing a data about clients' transactions.

Russian Patent No.: 2,795,371-C1, issued on May 3, 2023, assigned to Group IB LLC, and entitled "METHOD AND SYSTEM OF DEPERSONALIZED ASSESSMENT OF CLIENTS OF ORGANIZATIONS FOR CARRYING OUT OPERATIONS BETWEEN ORGANIZATIONS," discloses methods for depersonalizing clients for conducting transactions between organizations. More specifically, this patent discloses a possibility of collaboration between banks in order to accumulate data about fraudsters on a third-party server in anonymized form.

U.S. Pat. No. 10,785,287-B2, issued on Sep. 22, 2020, assigned to Visa International Service Association, and entitled "SECURE BINDING OF SOFTWARE APPLICATION TO A COMMUNICATION DEVICE," discloses techniques for securely binding a software application to a communication device that may include sending a set of device identifiers associated with the computing device to a server, receiving a server-generated dynamic device identifier that is generated based on the set of device identifiers; and storing the server-generated dynamic device identifier during initialization of the application. During runtime execution of the application, the application may receive a request to execute an application specific task. In response to receiving the request, the application may generate a runtime dynamic device identifier, determine whether the runtime dynamic device identifier matches the server-generated dynamic device identifier, execute the application specific task when the runtime dynamic device identifier matches the server-generated dynamic device identifier; and prevent the application specific task from being executed when the runtime dynamic device identifier does not match the server-generated dynamic device identifier.

Also, U.S. Pat. No. 10,153,901-B2, issued on Dec. 11, 2018, assigned to Concierge Holdings Inc, and entitled "SYSTEM AND METHOD FOR VERIFYING USER IDENTITY IN A VIRTUAL ENVIRONMENT," discloses systems and methods for verifying user identity in a virtual environment that may include the use of a trusted third party to perform identity verification. Devices may be configured such that the device is unalterably bound to a particular user via biometric data stored on the device and/or with the third party.

U.S. Pat. No. 11,259,183-B2, issued on Feb. 22, 2022, assigned to LookOut Inc, and entitled "DETERMINING A SECURITY STATE DESIGNATION FOR A COMPUTING DEVICE BASED ON SOURCE OF SOFTWARE," discloses determining a source for software to be installed on a computing device. In one approach, an application identifier is received from the computing device for an application to be installed. A source identifier of the application is determined. The application identifier and the source identifier are sent over a network to a server. A first state designation for the first application is received from the server. The first state designation represents a trusted state or an untrusted state. In response to receiving the first state designation, a second state designation is set. The second state designation is sent to the computing device.

SUMMARY

It is an object of the present technology to address at least some of the inconveniences present in the prior art.

Unlike the prior art approaches reviewed above that are predominantly directed to identifying instances of fraudulent user authorization in multiple applications or user devices, non-limiting embodiment of the present technology allow identifying compromised user devices in an application infrastructure, encompassing user devices and servers executing applications that belong to a given application family of banking applications.

More specifically, in accordance with a first broad aspect of the present technology, there is provided a computer-implemented method for identifying compromised user devices in an application infrastructure associated with an application family. The method is executable by one or more servers of the application infrastructure. The one or more servers are associated with a given application of the application family. The method comprises: in response to receiving, from a given user device executing the given application, a data container having a null value, the data container having the null being indicative of a first initiation of the given application on the given electronic device: generating a unique identifier, having an initial predetermined value, for the given user device; storing the unique identifier of the given user device in a database of the one or more servers; in response to receiving, from the given user device, an other data container including the unique identifier of the given user device having a then current value, the then current value being indicative of a respective initiation of the given application on the given user device, the then current value being indicative of all applications of the application family executed on the given user device: updating the then current value of the unique identifier of the given user device in the database, thereby generating an updated value of the unique identifier; and transmitting an updated container with the updated value of the unique identifier to the given user device; in response to receiving information indicative of the given user device being compromised: generating, for a subsequent initiation of the given application on the given user device, a then updated value of the unique identifier, indicative of the given user device being compromised; and transmitting a then updated data container with the then updated value of the unique identifier to the given user device, thereby enabling other servers of the application infrastructure, associated with other applications of the application family, to identify the given user device as being compromised and take remedial actions.

In some implementations of the method, the updating the then current value of the unique identifier comprises: identifying, in the database, the then current value of the unique identifier associated with the given user device; selecting at least one parameter from a set of parameters; and generating the updated value of the unique identifier based on the then current value of the unique identifier and current values of the at least one parameter from the set of parameters.

In some implementations of the method, the method further comprises encrypting each value of the unique identifier prior to transmitting to the given user device.

In some implementations of the method, the encrypting comprises applying a symmetric encryption algorithm.

In some implementations of the method, the symmetric encryption algorithm is a symmetric encryption algorithm with integrity control.

In some implementations of the method, the encrypting comprises applying an asymmetric encryption algorithm.

In some implementations of the method, the asymmetric encryption algorithm comprises an asymmetric encryption algorithm with integrity control.

In some implementations of the method, the method further comprises associating, in the database, the unique identifier with the given application initiation of which has triggered the given user device to transmit the then current value of the unique identifier to the one or more servers.

In some implementations of the method, the associating the unique identifier with the given application comprises assigning an application identifier.

In some implementations of the method, the application identifier is a package name of the given application on the given device.

In some implementations of the method, the set of parameters comprises at least one of: a time parameter; a user parameter; parameters of a system environment of the given user device; and a user device parameter.

In some implementations of the method, the generating the updated value of the unique identifier comprises: decrypting the other data container having the unique identifier of the then current value; retrieving the unique identifier of the given device; updating the at least one parameter from the set of parameters; and generating the updated container having the updated value of the unique identifier of the given user device.

In accordance with a second broad aspect of the present technology, there is provided a computer-implemented method for identifying compromised user devices in an application infrastructure associated with an application family. The method is executable by a given user device of the application infrastructure, executing a given application thereof. The method comprises: in response to a first initiation of the given application on the given user device, determining whether at least one other application of the application family is executed on the given user device; in response to failing to identify the at least one other application of the application infrastructure executed on the given user device, generating a data container having a null value for transmission thereof to a server associated with the given application, thereby causing the server to: receive the data container; generate a unique identifier for the given user device; and transmit an updated data container having the unique identifier to the given user device for storing the updated data container in service data of the given application; in response to identifying the at least one other application of the application infrastructure executed on the given user device: retrieving, from the service data of the at least one other application, an application data container for transmission thereof to the server associated with the given application, thereby causing the server to: receive the application data container; update the application data container, thereby generating an updated application data container; and transmitting the updated application data container to the given user device for storing the updated application data container in the service data of the given application; in response to any subsequent initiation of the given application on the given user device: transmitting a then current data container having a then current value of the unique identifier of the given user device to the server associated with the given application, thereby causing the server to: receive the then current data container; update the then current value of the unique identifier of the given user device, thereby generating a then updated value of the unique identifier; and transmit a then updated data container having the then updated value of the unique identifier to the user device for storing the then updated data container in the service data of the given application.

In some implementations of the method, the determining whether the at least one other application of the application family is executed on the given user device comprises: receiving a list of all applications installed on the given user device; determining presence of an identification data container associated with the application family in the service data of each application of the list of the applications.

In some implementations of the method, the method further comprises excluding system applications from the list of the applications.

In some implementations of the method, the determining the presence of the identification data container associated with the application family comprises executing a content provider application associated with the application family.

In accordance with a third broad aspect of the present technology, there is provided a server for identifying compromised user devices in an application infrastructure associated with an application family. The server is associated with a given application of the application family. The server comprises at least one processor and at least one non-transitory computer-readable memory storing executable instructions, which, when executed by the at least one processor, cause the server to: in response to receiving, from a given user device executing the given application, a data container having a null value, the data container having the null being indicative of a first initiation of the given application on the given electronic device: generate a unique identifier, having an initial predetermined value, for the given user device; store the unique identifier of the given user device in a database of the server; in response to receiving, from the given user device, an other data container including the unique identifier of the given user device having a then current value, the then current value being indicative of a respective initiation of the given application on the given user device, the then current value being indicative of all applications of the application family executed on the given user device: update the then current value of the unique identifier of the given user device in the database, thereby generating an updated value of the unique identifier; and transmit an updated container with the updated value of the unique identifier to the given user device; in response to receiving information indicative of the given user device being compromised: generate, for a subsequent initiation of the given application on the given user device, a then updated value of the unique identifier, indicative of the given user device being compromised; and transmit a then updated data container with the then updated value of the unique identifier to the given user device, thereby enabling other servers of the application infrastructure, associated with other applications of the application family, to identify the given user device as being compromised and take remedial actions.

In accordance with a fourth broad aspect of the present technology, there is provided an electronic device for identifying compromised user devices in an application infrastructure associated with an application family. The electronic device executes a given application of the application family. The electronic device comprises at least one processor and at least one non-transitory computer-readable memory storing executable instructions, which, when executed by the at least one processor, cause the electronic device to: in response to a first initiation of the given application on the given user device, determine whether at least one other application of the application family is executed on the given user device; in response to failing to identify the at least one other application of the application infrastructure executed on the given user device, generate a data container having a null value for transmission thereof to a server associated with the given application, thereby causing the server to: receive the data container; generate a unique identifier for the given user device; and transmit an updated data container having the unique identifier to the given user device for storing the updated data container in service data of the given application; in response to identifying the at least one other application of the application infrastructure executed on the given user device: retrieve, from the service data of the at least one other application, an application data container for transmission thereof to the server associated with the given application, thereby causing the server to: receive the application data container; update the application data container, thereby generating an updated application data container; and transmitting the updated application data container to the given user device for storing the updated application data container in the service data of the given application; in response to any subsequent initiation of the given application on the given user device: transmit a then current data container having a then current value of the unique identifier of the given user device to the server associated with the given application, thereby causing the server to: receive the then current data container; update the then current value of the unique identifier of the given user device, thereby generating a then updated value of the unique identifier; and transmit a then updated data container having the then updated value of the unique identifier to the user device for storing the then updated data container in the service data of the given application.

In the context of the present solution, unless expressly stated otherwise, the following terms are defined as follows:

An information data packet or a data container is a data packet that may comprise a set of identification components such as a unique identifier, time parameters, device parameters, user parameters of a given user device; in some cases, the information data packet may have a null value or, in other words, may be empty.

An application infrastructure comprises at least one server, associated with a given application of a given application family (such as those developed using one development environment/kit), and a plurality of user devices, communicatively coupled to the at least one server, executing the given application.

A server of the application infrastructure is a server that is located within the infrastructure and communicatively coupled to the plurality of user devices of the infrastructure. The server may be configured to encrypt the information in the data packets that are sent from the user devices and exchange them with other devices of the infrastructure. Also, as will become apparent from the description provided below, the server may be configured to generate unique identifiers for the user devices and may store the identifiers in a database of unique identifiers;

A database of unique identifiers is a database that may store the unique identifiers.

A unique identifier is a Unique ID number assigned to the given user device, and can be used, inter alia, to create an identification data packet.

An application unique identifier is a certain application identifier, for example, a package name.

An application of the infrastructure is an application that relates to the application infrastructure comprising the at least one server, developed to be capable of exchanging information with the server (for example, to receive the information container comprising the encrypted unique identifier and its dynamic updates).

Time parameters are parameters that provide information about time, for example, a timestamp, which may be used to create an updated unified identifier.

A device parameter can include, for example, a device identifier (or otherwise, a device ID) that can be used to create the unique identifier.

A user parameter includes any parameter associated with user of the application infrastructure, which can be, for example, a login.

An updated container is a container, which, after processing by the at least one server of the application infrastructure, has an updated value and is sent, by the server, to the given user device.

A null value of the container is a container without any information. For example, such a container can be sent by the given user device to the at least one server of the application infrastructure at a first launch of the given application of the infrastructure.

A content provider is an application that is developed for a certain operating system, such as an Android™ operating system or an iOS™ operating system, to transmit data between the applications.

A Software Development Kit (SDK) denotes a collection of software development tools in one installable package. In the context of the present specification, a given application family, defining a given application infrastructure, includes a plurality of various applications that have been developed using a respective single SDK.

A script—a set of commands or instructions that are configurable to be executed by a computer processor for implementing certain algorithm steps.

Further, in the context of the present specification, a "server" is a computer program that is running on appropriate hardware and is capable of receiving requests (for example, from client devices) over a network, and carrying out those requests, or causing those requests to be carried out. The hardware may be one physical computer or one physical computer system, but neither is required to be the case with respect to the present technology. In the present context, the use of the expression a "server" is not intended to mean that every task (for example, received instructions or requests) or any particular task will have been received, carried out, or caused to be carried out, by the same server (that is, the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, unless expressly provided otherwise, a computer system may refer, but is not limited, to an "electronic device", an "operation system", a "system", a "computer-based system", a "controller unit", a "control device" and/or any combination thereof appropriate to the relevant task at hand.

In the context of the present specification, unless expressly provided otherwise, the expression "computer-readable medium" and "memory" are intended to include media of any nature and kind whatsoever, non-limiting examples of which include RAM, ROM, disks (CD-ROMs, DVDs, floppy disks, hard disk drives, etc.), USB keys, flash memory cards, solid state-drives, and tape drives.

In the context of the present specification, a "database" is any structured collection of data, irrespective of its particular structure, the database management software, or the computer hardware on which the data is stored, implemented, or otherwise rendered available for use. A database may reside on the same hardware as the process that stores or makes use of the information stored in the database or it may reside on separate hardware, such as a dedicated server or plurality of servers.

In the context of the present specification, unless expressly provided otherwise, the words "first", "second", "third", etc. have been used as adjectives only for the purpose of allowing for distinction between the nouns that they modify from one another, and not for the purpose of describing any particular relationship between those nouns.

BRIEF DESCRIPTION OF THE DRAWINGS

Non-limiting embodiments of the present technology are described herein with reference to the accompanying drawings; these drawings are only presented herein to explain the essence of the technology and are not intended to limit the scope thereof in any way, where.

DETAILED DESCRIPTION

The following detailed description is provided to enable a person skilled in the art to implement and use the non-limiting embodiments of the present technology. Specific details are provided merely for descriptive purposes and to give insights into the present technology, and in no way as a limitation. However, it would be apparent to a person skilled in the art that some of these specific details may not be necessary to implement certain non-limiting embodiments of the present technology. The descriptions of specific implementations are only provided as representative examples. Various modifications of these embodiments may become apparent to the person skilled in the art; the general principles defined in this document may be applied to other non-limiting embodiments and implementations without departing from the scope of the present technology.

Non-limiting embodiments of the present technology are directed to systems and methods for identifying compromised user devices in an application infrastructure, such as an infrastructure of banking applications or other application families.

Generally, certain non-limiting embodiments of the present technology are based on a premise that some modern online applications, such as banking applications, for example, are developed using specific Software Development Kit (SDK) solutions. In SDK solutions, the information is usually processed on a single back-end server. In other words, any application that has been developed using a given SDK will be structurally arranged such that a given user device running the so developed application would need to exchange information with the back-end server. In the general case, any other software having a similar functionality may be used instead of the given SDK. Thus, such back-end servers associated with applications that have been developed using the given (single) SDK and user devices that are communicatively coupled to these back-end servers and execute these applications can be said to define a given application infrastructure.

According to some non-limiting embodiments of the present technology, the application infrastructure comprises only one back-end server. In other non-limiting embodiments of the present technology, the application infrastructure can comprise several sub-groups of back-end servers, where at least one of the sub-groups is united with a shared encryption key.

Figure 1:
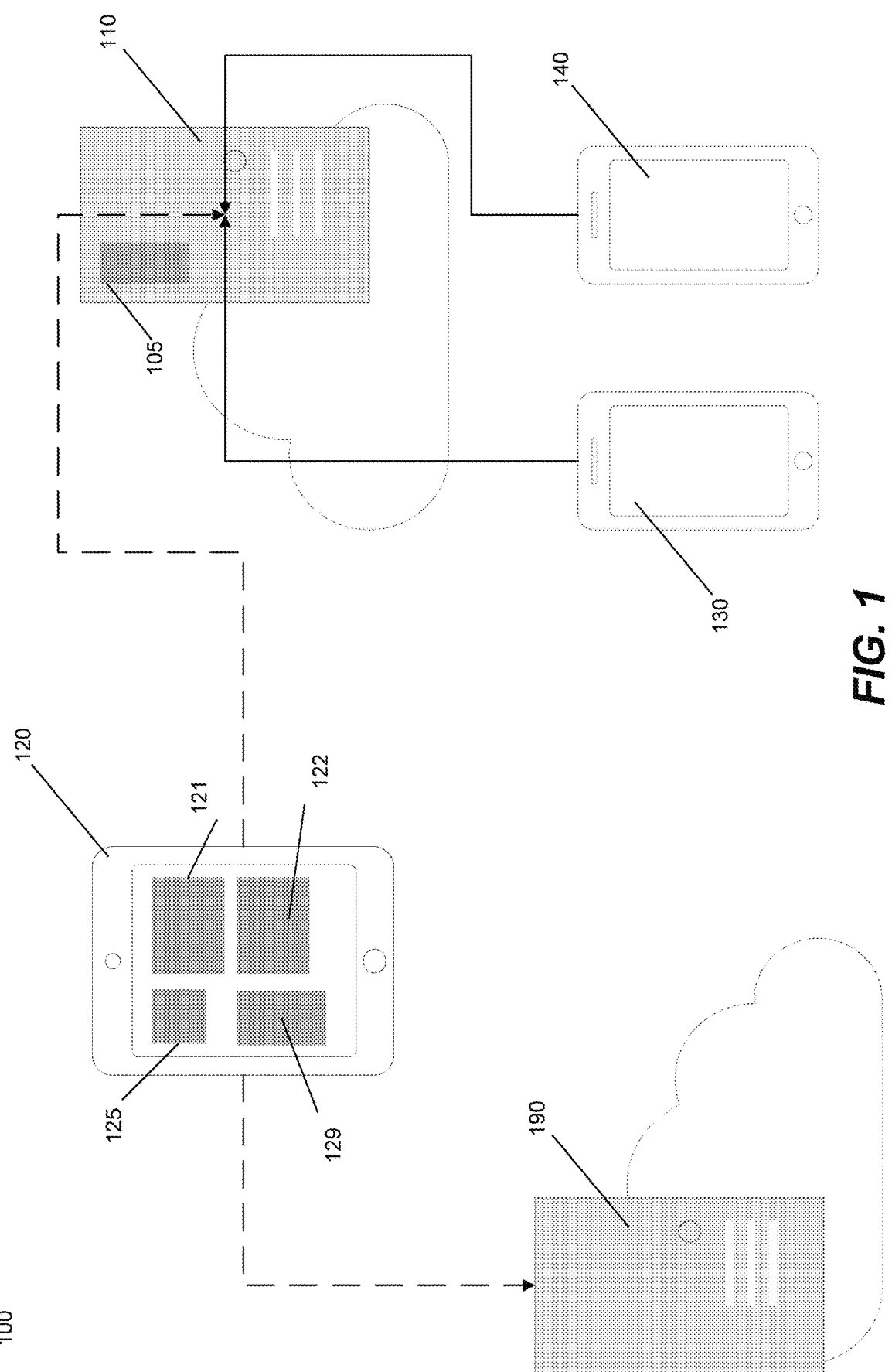
FIG. 1 depicts a schematic diagram of a given application infrastructure, in accordance with certain non-limiting embodiments of the present technology.

With reference to FIG. 1, there is depicted a schematic diagram of an application infrastructure 100 for identifying compromised devices, in accordance with certain non-limiting embodiments of the present technology. The application infrastructure 100 comprises a back-end server 110 that is hereinafter referred to as a server 110 and a plurality of user devices 120, 130, 140. According to some non-limiting embodiments of the present technology, the application infrastructure 100 can comprise several back-end servers that are similar to the server 110. The server 110 may host a database 105 that may be configured to store unique identifiers of user devices of the application infrastructure 100, as will be described below. According to other non-limiting embodiments of the present technology, the server 110 can be communicatively coupled to the database 105. The server 110 is configured to communicate with each of the user devices 120, 130, 140 via a respective (wired or wireless) communication link.

Figure 5:
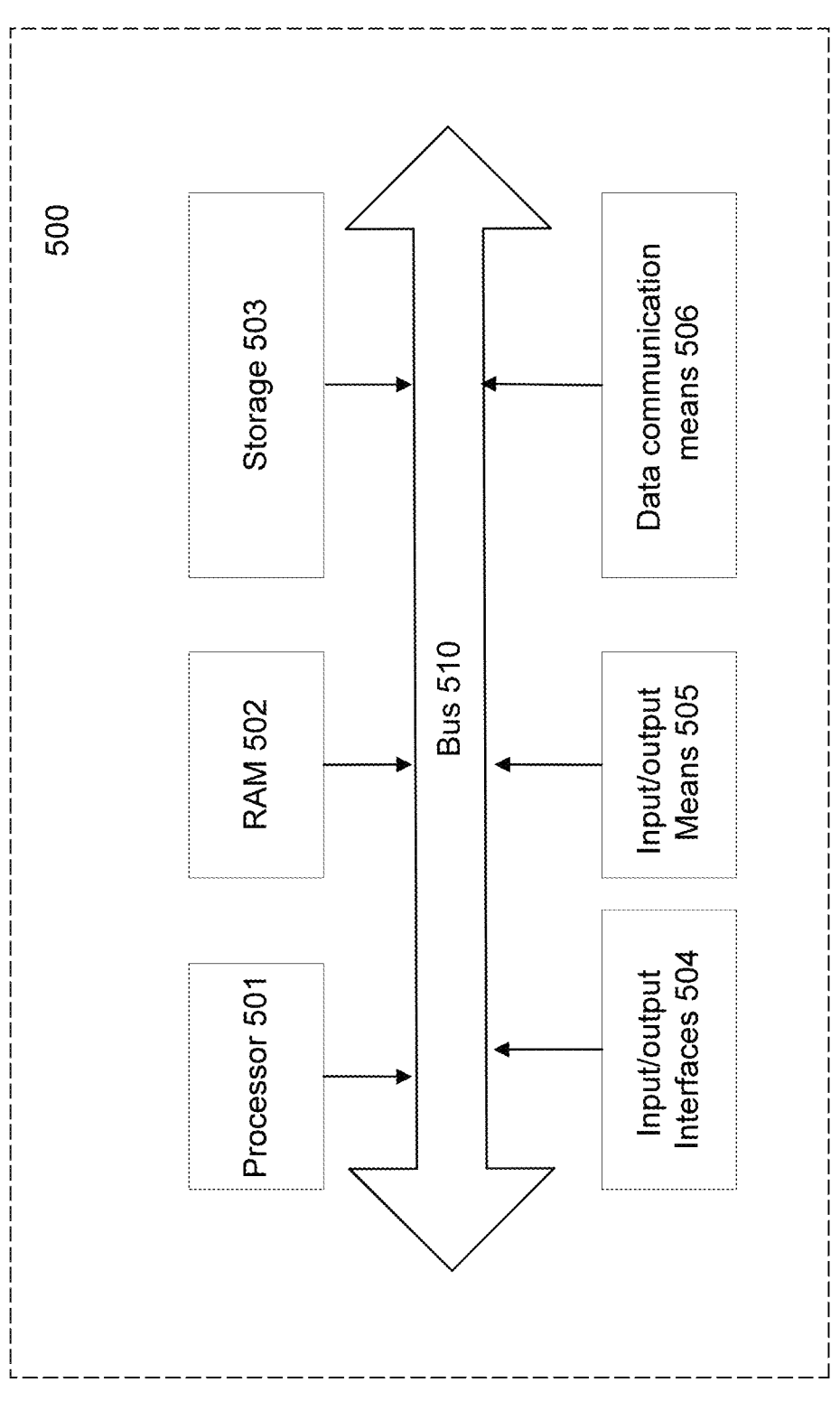
FIG. 5 depicts a schematic diagram of an example computing environment configurable for execution of the first and second methods of FIGS. 2 and 4, respectively, in accordance with certain non-limiting embodiments of the present technology.

According to certain non-limiting embodiments of the present technology, each back-end server, such as the server 110 of the application infrastructure 100 can be implemented as a conventional computer server and may comprise some or all of the components of a computing environment 500 schematically depicted in FIG. 5. In a specific non-limiting example, the server 110 is implemented as a Dell™ PowerEdge™ Server running the Microsoft™ Windows Server™ operating system but can also be implemented in any other suitable hardware, software, and/or firmware, or a combination thereof. In some non-limiting embodiments of the present technology, the server 110 is a single server. In alternative non-limiting embodiments of the present technology, the functionality of the server 110 of the application infrastructure 100 may be distributed and may be implemented via multiple software or hardware servers.

Further, according to certain non-limiting embodiments of the present technology, a given one of the plurality of user devices 120, 130, and 140 can comprise a respective hardware capable of executing a relevant task at hand, and can be implemented, for example, without limitation, as a personal computer, a tablet computer, a smartphone, a laptop, and the like. To that end, the given one of the plurality of user devices 120, 130, and 140 can also include some or all components of the computing environment 500.

According to certain non-limiting embodiments of the present technology, the server 110 can be configured to generate and assign to each of the plurality of user devices 120, 130, and 140, a respective unique identifier that can be packed in the identification container or a data container for transmission thereof to the respective user device. In some non-limiting embodiments of the present technology, the server 110 can be configured to encrypt the data container with the unique identifier prior to transmitting the data container to the respective user device, thereby ensuring anonymity of all the clients of the application infrastructure 100.

At least some non-limiting embodiments of the present technology can allow informing nodes of the application infrastructure 100, such as the servers and other user devices, about compromised user devices within a given application infrastructure, such as the application infrastructure 100. In order to conduct fraudulent transactions, fraudsters usually install a large number of banking applications on their devices. Various non-limiting embodiments of the present technology solution can allow informing all the servers of the application infrastructure 100 (such as all back-end servers of banks) which applications are comprised in the application infrastructure 100 and to store the corresponding identification container in case information about compromising is received in one of the applications.

Several applications of the application infrastructure 100, such as applications 121, 122, that are installed on a first device 120 may be installed on each of the plurality of user devices. Also, a content provider application 125 is installed on each of the plurality user devices 120, 130, and 140.

It should be noted that applications of the application infrastructure 100 that are issued, for example, by different banks, may be installed on each of the plurality of user devices. In particular, a third application 129 that has been developed for interacting with a second server 190 that is associated with another bank, that is, a bank B, may be also installed on the first device 120 along with the applications 121, 122 developed for interacting with the server 110 and issued by a bank A with which the server 110 is associated. In this case, embodiments of the present technology are based on a premise that each one of the applications 121, 122, 129 belongs to a same application family, that is, has been developed using the same SDK.

The present systems and methods for identifying compromised user devices will now be described. First, there will be described a part of the present method for identifying compromised user devices that is executed on a given user device, such as a given one of the plurality of user devices 120, 130, and 140.

Figure 2:
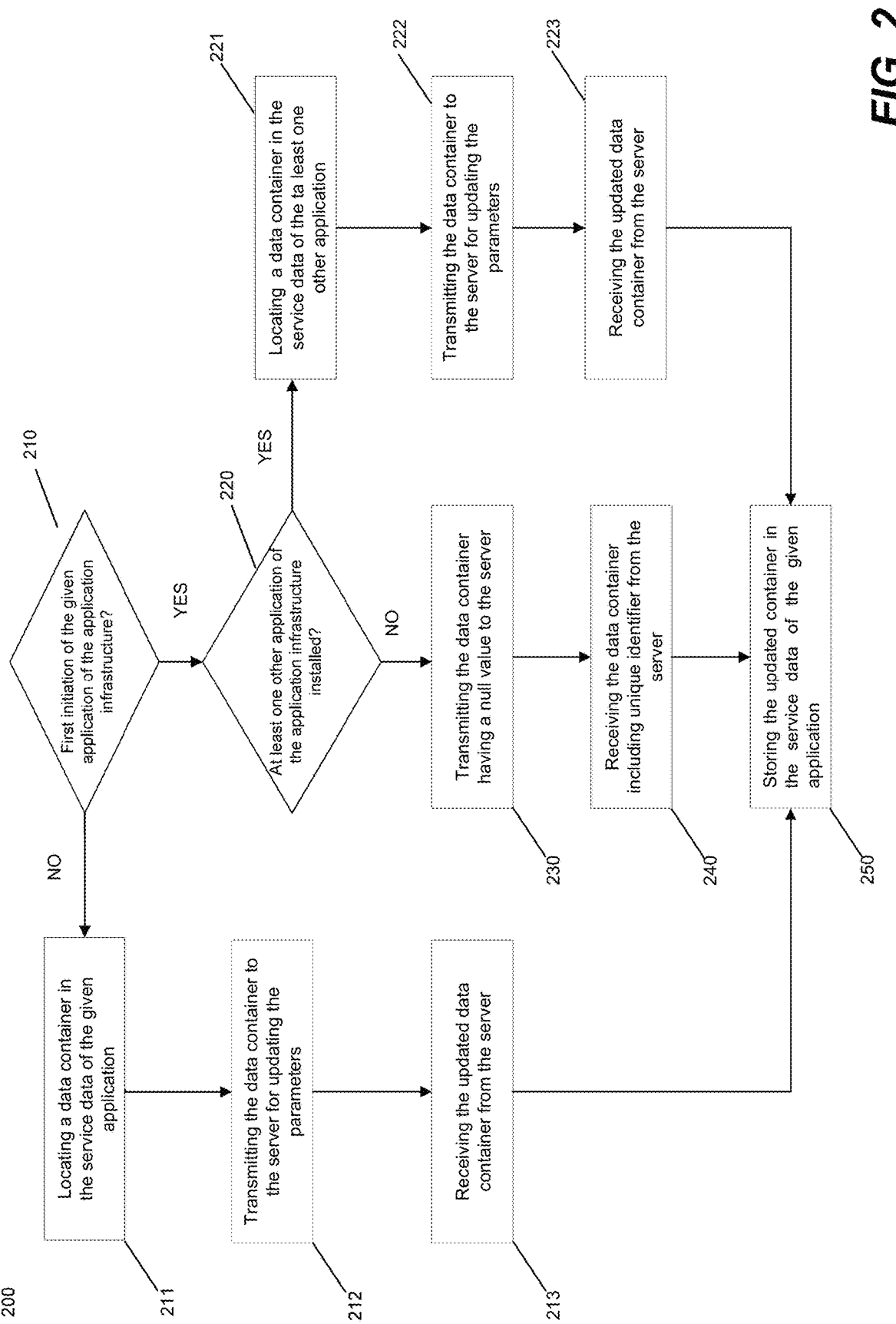
FIG. 2 depicts a flowchart diagram of a first method for generating and updating a data container associated with a given application on a given user device of the given application infrastructure of FIG. 1, in accordance with certain non-limiting embodiments of the present technology.

With reference to FIG. 2, there is depicted a flowchart diagram of a first method 200 for identifying compromised user devices, in accordance with certain non-limiting embodiments of the present technology.

As best seen from FIG. 2, the first method 200 has three scenarios. A first scenario comprises steps 210-250. This scenario will be implemented if the given application of the application infrastructure 100 has been initiated (launched) on the given user device for the first time, while no other applications of the application family to which the given application belongs are installed on the given user device.

The first method 200 starts at step 210 with the given user device determining whether a given application of the application family associated with the application infrastructure 100 has been launched for the first time. If the given application has been launched for the first time, the first method 200 will proceed to step 220. If the application has already been launched before (that is, more than once), the first method 200 will proceed to step 211. According to certain non-limiting embodiments of the present technology, the given application executed by the given user device may comprise, without limitation, a banking application, a betting application, a retail application, and others.

According to certain non-limiting embodiments of the present technology, the given user device can be configured to execute step 210 by executing a respective program script. According to some non-limiting embodiments of the present technology, the respective program script can be a part of the SDK on which the given application has been developed. The script may be launched at each initiation of the given application.

Further, according to certain non-limiting embodiments of the present technology, step 220 comprises the given user device being configured to determine whether there is at least one other application of the same application family associated with the application infrastructure 100 is installed on the given user device. To this end, the given user device can be configured to retrieve a list of applications installed thereon. In some non-limiting embodiments of the present technology, the given user device can be configured to remove system applications from the list of application. A list of the system applications may be preliminarily compiled and stored in resources of the given application. Further, according to certain non-limiting embodiments of the present technology, the given user device can be configured to locate, in the service data of each one of the remaining applications of the list of applications, an identification data container. To do so, in some non-limiting embodiments of the present technology, the given user device can be configured to use the content provider application 125 to identify applications by reading the service data thereof. The identification data container may represent a sequence of bytes of a pre-determined length, for example, 256 bytes. In some non-limiting embodiments of the present technology, the identification data container can be encrypted, for example, by taking a hash function from any string of the sequence of bytes. If the given user device has identified the identification data container in the service data of at least one other application installed on the given user device and belonging to the same application family as the given application, the given user device can thus determine that another application of the application infrastructure 100 is installed on the given user device.

The first method 200 hence advances to step 221.

It should be noted that the at least one other application of the application infrastructure 100 may not necessarily be associated with the same server as the given application that has conducted the search. For example, referring back to FIG. 1, if the first application 121 is initiated for the first time, then the found application may be both the application 122 that is developed by the bank A and operates with the server 110, and the third application 129 that is developed by the bank B and operates with the second server 190.

If the given user device has failed to locate the identification data container in the service data of the applications installed on the given user device, then the given user device can be configured to determine the given application as being an only application of the application infrastructure 100 installed on the given user device.

The first method 200 hence proceeds to step 230.

According to certain non-limiting embodiments of the present technology, at step 230, the given user device can be configured to transmit a data container having a null value to the server 110. In this way, anonymization of the client data is ensured. In turn, the server 110 can be configured to generate a unique identifier for the given user device without use of any user personal data.

According to certain non-limiting embodiments of the present technology, to execute step 230, the given user device can be configured to execute the respective program script. Also, an IP address of the server 110 can be obtained from the service data of the given application.

The first method 200 hence advances to step 240.

As will become apparent from the description provided hereinbelow, at step 240, according to certain non-limiting embodiments of the present technology, the given user device can be configured to receive, from the server 110, an updated data container including the unique identifier of the given user device. According to some non-limiting embodiments of the present technology, the received updated container may be encrypted. According to alternative non-limiting embodiments of the present technology, the received updated data container may be non-encrypted.

Then, the first method 200 thus proceeds to step 250.

According to certain non-limiting embodiments of the present technology, at step 250, the given user device can be configured to store the updated data container, including the unique identifier of the given user device, and received from the server 110, in the service data of the given application. In order to store the unique identifier in the service data of the given application, the given user device can be configured to use the content provider application 125. The first scenario of the first method 200 hence terminates.

Now, a second scenario of the first method 200 will be described. The second scenario will be described hereinbelow with regard to each of steps thereof: 211, 212, 213, and 250. According to certain non-limiting embodiments of the present technology, the given user device is configured to execute the second scenario at all subsequent initiations (launches) of the given application. More specifically, at each subsequent initiation, the given user device can be configured to send a data container including a current value of the unique identifier of the given device to the server 110 for updating parameters, such as a time parameter. In other non-limiting embodiments of the present technology, the server 110 can also be configured to update other parameters such as device parameters, user parameters, system environment parameters.

More specifically, at step 211, according to creatin non-limiting embodiments of the present technology, the given user device can be configured to locate, in the service data of the given application, such as the first application 121, the data container including the then current value of the unique identifier of the given user device. To do so, according to certain non-limiting embodiments of the present technology, the given user device can be configured to execute the content provider application 125. The second scenario of the first method 200 hence advances to step 212.

At step 212, according to certain non-limiting embodiments of the present technology, the given user device is configured to transmit the data container having the then current value of the unique identifier of the given user device to the server 110 for updating the parameters. According to certain non-limiting embodiments of the present technology, the given user device can be configured to execute this step similarly to step 230 of the first scenario, that is, by executing the respective program script. The second scenario of the first method 200 thus proceeds to step 213.

At step 213, similar to step 240, according to certain non-limiting embodiments of the present technology, the given user device can be configured to receive, from the server 110, the data container including an updated value of the unique identifier of the given user device, representative of the updated parameters. Finally, the second scenario of the first method 200 proceeds to step 250 that has been described above. The second scenario of the first method 200 hence terminates.

Now, a third scenario of the first method 200, comprising steps 221, 222, 223, and 250, will be described. According to certain non-limiting embodiments of the present technology, the given user device can be configured to execute the third scenario of the first method 200 if the given application has been launched for the first time, but there is at least one another application of the same application family as the given application, such as a second application 122, installed and executed on the given user device.

The third scenario commences at step 221 comprises with the given user device being configured to locate, in the service data of the second application 122, a data identification container. To do so, the given user device can be configured to execute the content provider application 125. The third scenario of the first method 200 thus proceeds to step 222.

At step 222, according to certain non-limiting embodiments of the present technology, the given user device can be configured to transmit the data identification container to the server 110 for updating the parameters similarly as described above with respect to steps 212 and 230. The third scenario of the first method 200 hence proceeds to step 223.

At step 223, similar to steps 213 and 240, according to certain non-limiting embodiments of the present technology, the given user device can be configured to receive, from the server 110, the data container including an updated value of the unique identifier of the given user device, representative of the updated parameters. Finally, the third scenario of the first method 200 proceeds to step 250 that has been described above.

The first method 200 hence terminates.

Figure 3:
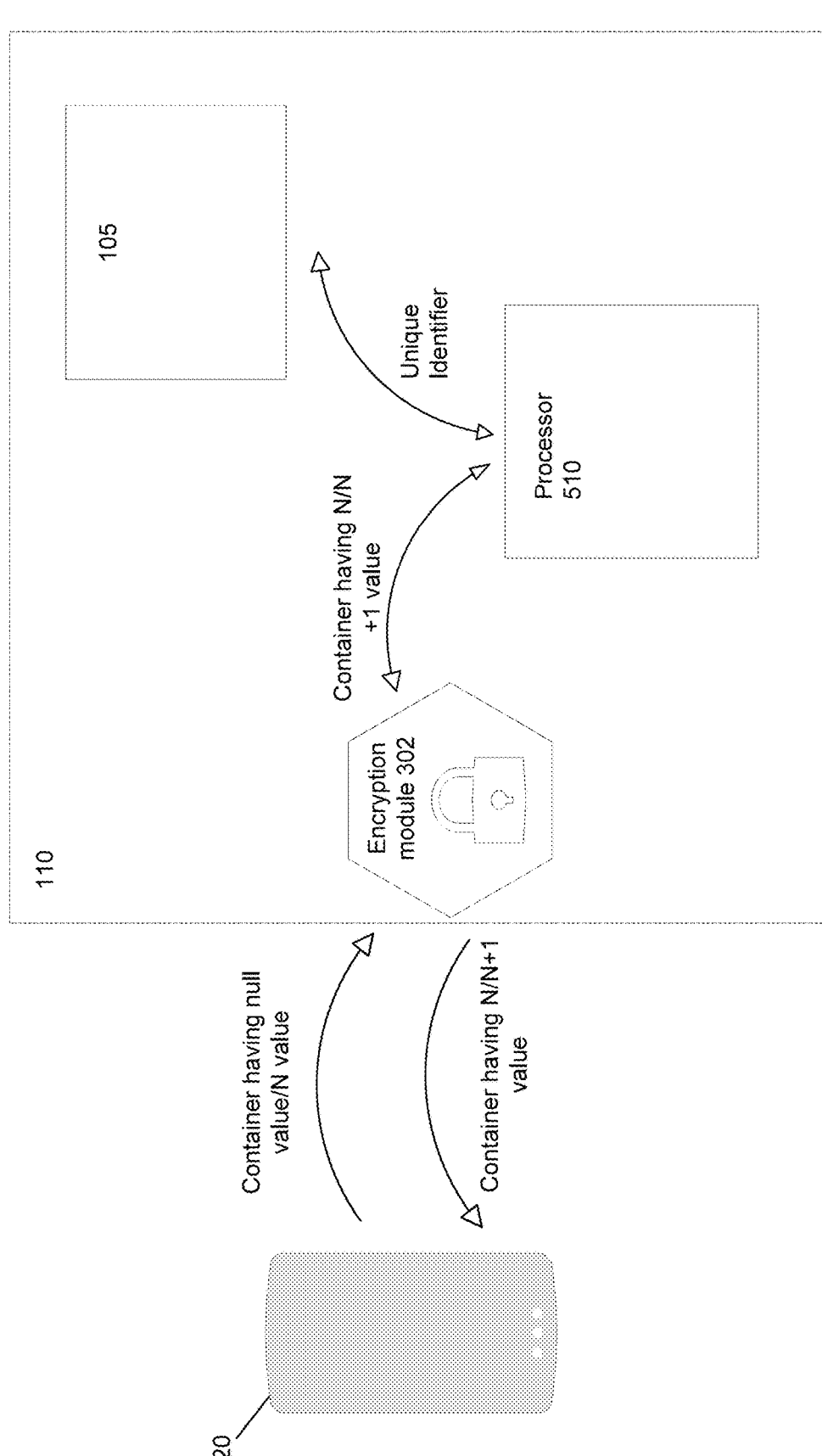
FIG. 3 depicts a schematic diagram of a step for transmitting a given data container between a server and the given user device within the given application infrastructure of FIG. 1, in accordance with certain non-limiting embodiments of the present technology.

Further, with reference to FIG. 3, there is depicted a schematic diagram of a step for transmitting a given data container between the server 110 and the given user device for updating the value of the unique identification thereof, in accordance with certain non-limiting embodiments of the present technology.

According to certain non-limiting embodiments of the present technology, the server 110 can be configured to receive, from the given user device, such as the first user device 120, the identification data container. As described above, the data container may have a null value if the given application of the application infrastructure 100 has been initiated for the first time, whereas the data container sent by the given user device has a non-null value at subsequent launches of the given application. According to some non-limiting embodiments of the present technology, the data container can be encrypted. In this case, according to certain non-limiting embodiments of the present technology, the server 110 can be configured to decrypt the received data container by using an encryption module 302, configured to encrypt the data as described above, and transmitted to a processor 510 of the server 110 for further processing. According to some non-limiting embodiments of the present technology, the data container transmitted by the given user device can be non-encrypted; and in this case, the step of decrypting the data container can be omitted.

Further, once the server 110 has received the data container including the then current value of the unique identifier from the given user device, the server 110 can be configured to (1) generate and submit a request to the database 105; (2) receive, from the database 115, the unique identifier for the given user device and a current timestamp; and (3) generate the updated value of the unique identifier based on the current timestamp. In some non-limiting embodiments of the present technology, the server can be configured to generate the updated value by adding to the previous value of the unique identifier a predetermined number. For example, if the then current value of the unique identifier was N, the updated value, for a given subsequent launch of the given application, can be N+1. In some non-limiting embodiments of the present technology, the server 110 can be configured to store the updated value of the unique identifier in the database 115. However, in other non-limiting embodiments of the present technology, for the purposes of data safety, the server 110 can be configured not to store the updated value and transmit it for storing only on the given user device.

Further, in some non-limiting embodiments of the present technology, the server 110 can be configured to transmit the so generated updated value of the unique identifier back to the given user device. In some non-limiting embodiments of the present technology, prior to transmitting the updated value, the server 110 can be configured to encrypt it using the encryption module 302 as mentioned below.

Figure 4:
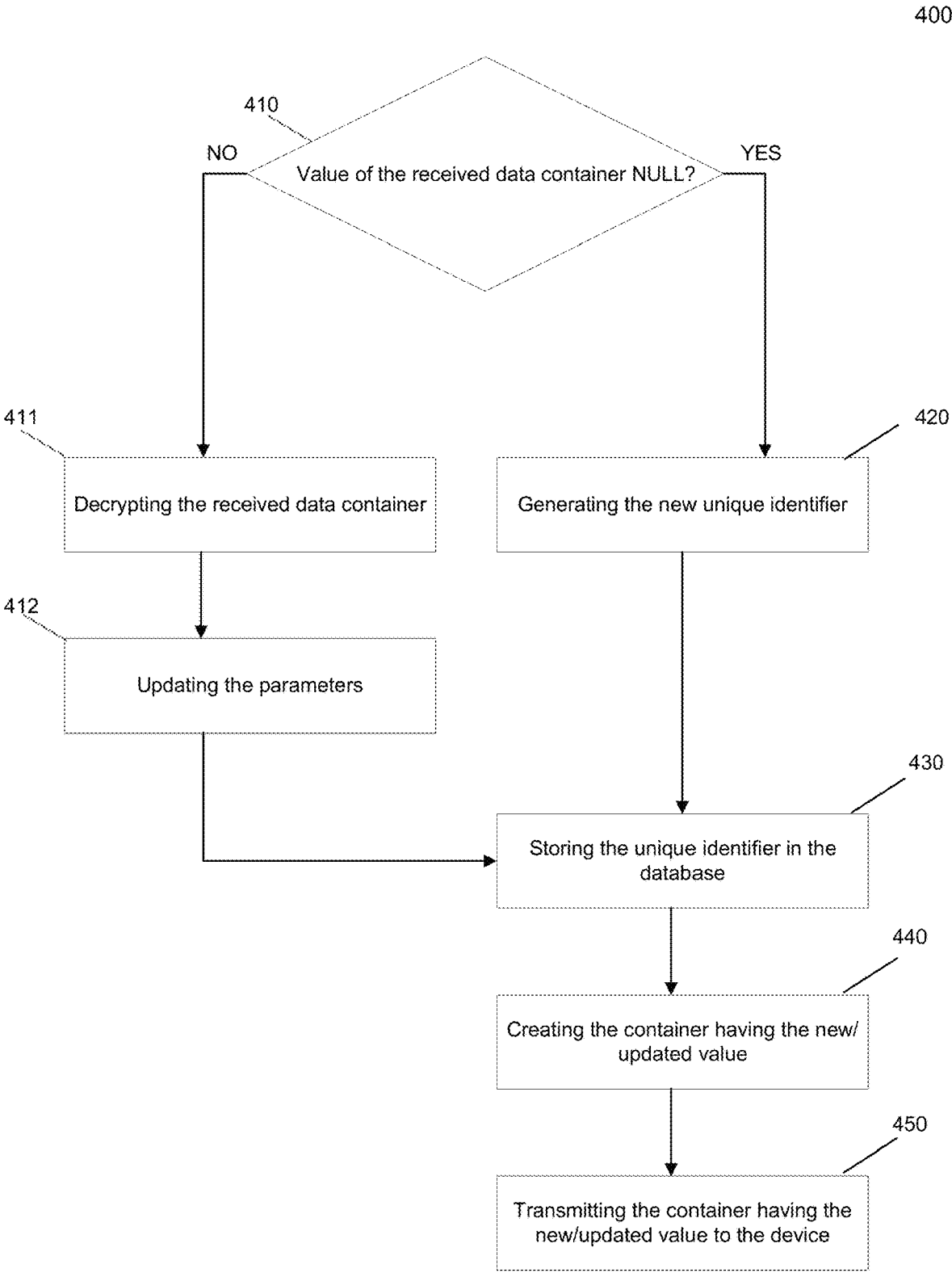
FIG. 4 depicts a flowchart diagram of a second method for generating a unique identifier for the given user device in the given application infrastructure of FIG. 1, in accordance with certain non-limiting embodiments of the present technology.

With reference to FIG. 4, there is depicted a flowchart diagram of a second method 400 for generating and updating the values of the unique identifier of the given user device in the application infrastructure 100, in accordance with certain non-limiting embodiments of the present technology. According to certain non-limiting embodiments of the present technology, the second method can be executed by the server 110. According to certain non-limiting embodiments of the present technology, the second method 400 has two possible scenarios.

According to certain non-limiting embodiments of the present technology, the server 110 can be configured to execute the first scenario of the second method 400 if the data container received from the given user device has a null value, that is, void. In this case, the server 110 can be configured to generate the unique identifier for the given user device. The first scenario of the second method 400 comprises steps 410, 420, 430, 440, and 450.

According to certain non-limiting embodiments of the present technology, the server 110 can be configured to execute the second scenario of the second method 400 if the received data container from the given user device has a non-null value, that is, a then current value of the unique identifier of the given user device. The second scenario of the second method 400 comprises 411, 412.

The second method 400 commences at step 410 with the server 110 being configured to receive a given data container from the given user device. In some non-limiting embodiments of the present technology, along with the given data container, the server 110 can be configured to receive, from the given user device, a then current value of the unique identifier of the given user device. Further, the server 110 can be configured to determine the value of the given data container. If the given data container has the null value, then the server 110 proceeds to execute step 420 of the first scenario of the second method 400. the process will perform the first scenario and proceed to the step 420. Otherwise, if the received data container has the unified identifier that already has some non-null value, that is, the then current value, the server 110 can be configured to execute step 411 of the second scenario of the second method 400.

Now, the first scenario of the second method 400 will be described in greater detail.

At step 420, according to certain non-limiting embodiments of the present technology, the server 110 can be configured to generate the unique identifier for the given user device, from which the server 110 has received the data container. In some non-limiting embodiments of the present technology, to generate the unique identifier, the server 110 can be configured to execute a pre-stored program script, which can be configured, for example, to generate random values. The first scenario of the second method 400 hence advances to step 430.

At step 430, according to certain non-limiting embodiments of the present technology, the server 110 can be configured to store the generated unique identifier in the database 115 of unique identifiers. In the database 115, according to certain non-limiting embodiments of the present technology, the server 110 can be configured to store the so generated unique identifier in association with a device identifier of the given user device. According to alternative non-limiting embodiments of the present technology, the server 110 can be configured not to store the unique identifier in the database 110 but store it in a temporary memory of the server 110. The first scenario of the second method 400 hence advances to step 440. In some non-limiting embodiments of the present technology, the server 110 can be configured to associate the unique identifier of the given user device with the given application that caused the given user device to transmit the data container to the server 110. To that end, the server 110 can be configured to store, in the database 105, the respective application identifier in association with the device identifier and the unique identifier of the given user device. According to certain non-limiting embodiments of the present technology, the respective application identifier can be an ID number of the given application enabling for unique identification thereof in a given operating system, such as a respective package name of the given application in the Android™ operating system.

Further, at step 440, according to certain non-limiting embodiments of the present technology, the server 110 can be configured to generate a new data container including the unique identifier of the given user device having a predetermined value, such as an N value. The new data container having N value includes a set of parameters. In some non-limiting embodiments of the present technology, the server 110 can be configured to encrypt the new data container using, for example, the encryption module 302 mentioned above with reference to FIG. 3. According to some non-limiting embodiments of the present technology, the encryption module 302 can be configured to execute a symmetric encryption algorithm. In some non-limiting embodiments of the present technology, the symmetric encryption algorithm can comprise a symmetric encryption algorithm with integrity control. In some non-limiting embodiments of the present technology, the encryption module 302 is configured to execute an asymmetric encryption algorithm. According to certain non-limiting embodiments of the present technology, the asymmetric encryption algorithm can comprise an asymmetric encryption algorithm with integrity control. The first scenario of the second method 400 hence advances to step 450.

At step 450, according to certain non-limiting embodiments of the present technology, the server 110 can be configured to transmit the so generated new data container to the given user device for further storing in the service data of the given application. The first scenario of the second method 400 hence terminates.

Now, the second scenario of the second method 400 will be described. As mentioned above, the sever 110 can be configured to execute the second scenario of the second method 400 if the server 110 has received the data container from the given user device having a non-null value.

At step 411, according to certain non-limiting embodiments of the present technology, the server 110 can be configured to decrypt the data container received from the given user device. Encryption keys are stored on the server. The encryption ensures safe transmission of the data from the server 110 to the applications of the application infrastructure 100, as well as safe storage of the containers on user devices. The second scenario of the second method 400 hence advances to step 412.

At step 412, according to certain non-limiting embodiments of the present technology, the server 110 can be configured to update the received data container by replacing the timestamp with an actual one. To this end, the server 110 can be configured to make a request to a system clock of the server 110. The updated container consists of the former unique identifier that is generated at the step 420 and the actualized timestamp, defining the updated value of the unique identifier of the given user device.

The second scenario of the second method 400 hence advances to step 430, and further to steps 440 and 450, which have been described in detail above. The second method 400 hence terminates.

As mentioned above, the methods described herein may allow informing all servers of the application infrastructure 100 (such as those associated with various banks) which applications are executed on user devices of the application infrastructure 100 about a compromised device.

Referring back to FIG. 1, a non-limiting example of how the present methods are used for distributing information about the compromised devices in the application infrastructure 100 will now be described. For example, the server 110 has received information about the first user device 120 being compromised. For example, the server 110 can be configured to receive this information from a third-party independent source that is not an object of the present description. This information may be received, for example, from an internal scoring database of clients of this bank, from an open resource for compromised mobile devices, such as a VirusTotal™ service, from an antifraud analytics department, or from any other similar source, as an example.

In response, the server 110 can be configured to generate and store in the database 105, a flag or stamp "compromised" indicative if the first user device 120 being compromised in association with the first user device 120.

Further, when, at a subsequent initiation of the first application 121, the server 110 receives another data container for updating the parameters, the server 110 can be configured to generate an updated value of the unique identifier of the first user device 120 that is indicative of the first user device 120 being compromised, adding to the updated container the flag or the stamp "compromised" from the database 105 as mentioned above from. Further, the server 110 can be configured to transmit the updated data container with the updated parameters, including the information of the first user device 120 being compromised, to the first device 120.

Thus, when the third application 129 of the second server 190 is initiated on the first device 120 for the next time, it will find the container including the information of the first user device being compromised in the service data of the first application 121, according to the above-described steps. Further, as described above, the third application 129 can be configured to transmit this container to the second server 190 for updating the parameters. Thus, by receiving the data container from the first user device 120, the second server 190 can be configured to receive the information of the first user device 120 being compromised and can take certain remedial actions, such as blocking, quarantining the first user device 120, or sending the corresponding notification to the user thereof. In yet other non-limiting embodiments of the present technology, the second server 190 can be configured to identify the user of the first user device 120. Additionally, the second server 190 can be configured to store the information of the first user device 120 being compromised in a database of the second server 190 in association with the device identifier of the first user device 120.

According to certain non-limiting embodiments of the present technology, the information about certain user devices being compromised can be exchanged directly among back-end servers of the application infrastructure 100, that is, in the present example, between the server 110 and the second server 190 directly, without transmitting data container through user devices.

Computing Environment

With reference to FIG. 5, there is depicted an example functional diagram of the computing environment 500 configurable to implement certain non-limiting embodiments of the present technology including the first and second methods 200, 400 described above.

In some non-limiting embodiments of the present technology, the computing environment 500 may include: the processor 501 comprising one or more central processing units (CPUs), at least one non-transitory computer-readable memory 502 (RAM), a storage 503, input/output interfaces 504, input/output means 505, data communication means 506.

According to some non-limiting embodiments of the present technology, the processor 501 may be configured to execute specific program instructions the computations as required for the computing environment 500 to function properly or to ensure the functioning of one or more of its components. The processor 501 may further be configured to execute specific machine-readable instructions stored in the at least one non-transitory computer-readable memory 502, for example, those causing the computing environment 500 to execute the first and second methods 200, 400 described above.

In some non-limiting embodiments of the present technology, the machine-readable instructions representative of software components of disclosed systems may be implemented using any programming language or scripts, such as C, C++, C#, Java, JavaScript, VBScript, Macromedia Cold Fusion, COBOL, Microsoft Active Server Pages, Assembly, Perl, PHP, AWK, Python, Visual Basic, SQL Stored Procedures, PL/SQL, any UNIX shell scripts or XML. Various algorithms are implemented with any combination of the data structures, objects, processes, procedures, and other software elements.

The at least one non-transitory computer-readable memory 502 may be implemented as RAM and contains the necessary program logic to provide the requisite functionality.

The storage 503 may be implemented as at least one of an HDD drive, an SSD drive, a RAID array, a network storage, a flash memory, an optical drive (such as CD, DVD, MD, Blu-ray), etc. The storage 503 may be configured for long-term storage of various data, for example, the aforementioned documents with user data sets, databases with the time intervals measured for each user, user IDs, etc.

The input/output interfaces 504 may comprise various interfaces, such as at least one of USB, RS532, RJ45, LPT, COM, HDMI, PS/2, Lightning, Fire Wire, etc.

The input/output means 505 may include at least one of a keyboard, joystick, (touchscreen) display, projector, touchpad, mouse, trackball, stylus, speakers, microphone, and the like. A communication link between each one of the input/output means 505 can be wired (for example, connecting the keyboard via a PS/2 or USB port on the chassis of the desktop PC) or wireless (for example, via a wireless link, for example, radio link, to the base station, which is directly connected to the PC, for example, to a USB port).

The data communication means 506 may be selected based on a particular implementation of the communication network 210 and may comprise at least one of: an Ethernet card, a WLAN/Wi-Fi adapter, a Bluetooth adapter, a BLE adapter, an NFC adapter, an IrDa, a RFID adapter, a GSM modem, and the like. As such, the connectivity hardware 404 may be configured for wired and wireless data transmission, via one of WAN, PAN, LAN, Intranet, Internet, WLAN, WMAN, or GSM networks.

These and other components of the computing environment 500 may be linked together using a common data bus 510.

It should be expressly understood that not all technical effects mentioned herein need to be enjoyed in each and every embodiment of the present technology.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

The invention claimed is:

1. A computer-implemented method for identifying compromised user devices in an application infrastructure associated with an application family, the application infrastructure including a first application and a second application installed on the given user device, the first application being associated with a first server, and the second application being associated with a second server, the method comprising:

initiating the first application on the given user device;

initiating the second application on the given user device, determining that the first and second applications are from the application family, the determining comprising:

receiving a list of family applications installed on the given user device;

determining presence of a data container associated with the application family in service data of each one of the first and second applications;

retrieving, from the service data of the first application, the data container including a current value of a unique identifier of the given user device;

transmitting the data container to the first server associated with the first application for updating the current value of the unique identifier, thereby causing the first server to:

generate an updated value of the unique identifier, indicative of the given user device being compromised; and transmit, to the given user device, the data container including the updated value of the unique identifier of the given user device;

receiving, from the first server, the data container including the updated value of the unique identifier;

storing the data container in the service data of both the first and second applications; and transmitting, to the second server associated with the second application, the data container including the updated value of the unique identifier of the given user device, to enable the second server to identify the given user device as being compromised.

2. The method of claim 1, further comprising excluding system applications from the list of the family applications.

3. The method of claim 2, wherein the determining the presence of the data container associated with the application family comprises executing a content provider application associated with the application family.

4. An electronic device for identifying compromised user devices in an application infrastructure associated with an application family, the electronic device being configured for executing: a first application and a second application installed on the electronic device, the first application being associated with a first server, and the second application being associated with a second server, the electronic device comprising:

at least one processor and at least one non-transitory computer-readable memory storing executable instructions, which, when executed by the at least one processor, cause the electronic device to:

initiate the first application on the electronic device;

initiate the second application on the electronic device;

determine that the first and second applications are from the application family, by:

receiving a list of family applications installed on the electronic device;

determining presence of a data container associated with the application family in service data of each one of the first and second applications;

retrieve, from the service data of the first application, the data container including a current value of a unique identifier of the electronic device;

transmit the data container to the first server associated with the first application for updating the current value of the unique identifier, thereby causing the first server to:

generate an updated value of the unique identifier, indicative of the electronic device being compromised; and transmit, to the electronic device, the data container including the updated value of the unique identifier of the electronic device;

receive, from the first server, the data container including the updated value of the unique identifier;

store the data container in the service data of both the first and second applications; and transmit, to the second server associated with the second application, the data container including the updated value of the unique identifier of the electronic device, to enable the second server to identify the electronic device as being compromised.

* * * * *